(12) United States Patent
Gould

(10) Patent No.: US 7,085,732 B2
(45) Date of Patent: Aug. 1, 2006

(54) ONLINE TRADING FOR THE PLACEMENT OF ADVERTISING IN MEDIA

(76) Inventor: Jedd Adam Gould, 86 Pinney St., Winsted, CT (US) 06098

( * ) Notice: Subject to any disclaimer, the term of this patent is extended or adjusted under 35 U.S.C. 154(b) by 729 days.

(21) Appl. No.: 10/251,634

(22) Filed: Sep. 18, 2002

(65) Prior Publication Data

US 2003/0074303 A1 Apr. 17, 2003

Related U.S. Application Data

(60) Provisional application No. 60/323,060, filed on Sep. 18, 2001.

(51) Int. Cl.
*G06Q 30/00* (2006.01)
(52) U.S. Cl. .......................................... 705/14; 705/37
(58) Field of Classification Search .................. 705/14, 705/37
See application file for complete search history.

(56) References Cited

U.S. PATENT DOCUMENTS

| | | | | |
|---|---|---|---|---|
| 5,105,184 A | 4/1992 | Pirani et al. | ................. | 345/629 |
| 5,636,346 A | 6/1997 | Saxe | ............................... | 705/1 |
| 5,724,521 A | 3/1998 | Dedrick | ........................ | 705/26 |
| 5,794,207 A | 8/1998 | Walker et al. | .................. | 705/1 |
| 5,890,138 A | 3/1999 | Godin et al. | ................... | 705/26 |
| 5,937,392 A | 8/1999 | Alberts | ......................... | 705/14 |
| 5,966,699 A | 10/1999 | Zandi | ........................... | 705/38 |
| 5,999,912 A | 12/1999 | Wodarz et al. | ................. | 705/14 |
| 6,009,409 A | 12/1999 | Adler et al. | .................... | 705/14 |
| 6,009,410 A | 12/1999 | LeMole et al. | ................ | 705/14 |
| 6,026,371 A | 2/2000 | Beck et al. | .................... | 705/14 |
| 6,029,045 A | 2/2000 | Picco et al. | .................... | 725/34 |
| 6,058,417 A | 5/2000 | Hess et al. | ................... | 709/219 |
| 6,085,169 A | 7/2000 | Walker et al. | ................. | 705/26 |
| 6,182,050 B1 | 1/2001 | Ballard | ......................... | 705/14 |
| 6,253,189 B1 | 6/2001 | Feezell et al. | ................ | 705/14 |
| 6,260,024 B1 | 7/2001 | Shkedy | .......................... | 705/37 |
| 6,415,270 B1 * | 7/2002 | Rackson et al. | ........... | 705/36 R |
| 6,990,462 B1 * | 1/2006 | Wilcox et al. | ................ | 705/14 |

(Continued)

FOREIGN PATENT DOCUMENTS

KR  2001100678 A  11/2001

(Continued)

OTHER PUBLICATIONS

Anon., "ORACLE: Oracle Announces Online Business-to-Business Marketplace," M2 Presswire, Jul. 29, 1999.

(Continued)

*Primary Examiner*—Nicholas D. Rosen
(74) *Attorney, Agent, or Firm*—John D. Albright; Rubenstein & Glazer, LLC

(57) ABSTRACT

An online trading system for conducting an advertiser initiated auction for the placement of an advertisement in a media, such as printed publications, billboards, radio, television, videos, network portals, web pages, and the like. An online session is conducted with the advertiser to form an auction ticket that specifies the price the advertiser is willing to pay for the advertisement. Also specified are dates the advertisement is to run, color preference, placement on a page or within the printed publication, and a list of media outlets from whom the advertiser wants to solicit bids. The media outlets are notified of the auction and given the auction ticket. Bids are submitted by specifying the amount of advertising space the media outlet is willing to allot for the specified price.

11 Claims, 3 Drawing Sheets

U.S. PATENT DOCUMENTS

| | | | |
|---|---|---|---|
| 2001/0037205 A1* | 11/2001 | Joao | 705/1 |
| 2001/0056396 A1 | 12/2001 | Goino | 705/37 |
| 2002/0035536 A1 | 3/2002 | Gellman | 705/37 |
| 2002/0082983 A1* | 6/2002 | Oshiba et al. | 705/37 |
| 2002/0107787 A1 | 8/2002 | Mashinsky et al. | 705/37 |
| 2002/0147674 A1 | 10/2002 | Gillman | 705/37 |
| 2002/0184092 A1* | 12/2002 | Cherry et al. | 705/14 |
| 2002/0184093 A1* | 12/2002 | Cherry et al. | 705/14 |
| 2003/0078850 A1* | 4/2003 | Hartman et al. | 705/26 |
| 2005/0033682 A1 | 2/2005 | Levy et al. | |

FOREIGN PATENT DOCUMENTS

| | | |
|---|---|---|
| WO | WO 00/50970 | 8/2000 |
| WO | WO 01/43027 | 6/2001 |
| WO | WO 01/90956 | 11/2001 |

OTHER PUBLICATIONS

Anon., "Auctioning Goes Online," New Media Age, p. 8, Dec. 16, 1999.

Anon., "Leading B2B Online Seafood Exchange Adds Cyber Auctions to Award-Winning Site. Gofish.com Brings Fish Auctions to the Internet," Business Wire, Apr. 11, 2000.

Long, R., "Setting a New Standard," Cable World, Oct. 30, 2000, vol. 12, No. 44, p. 34.

Rosen, Nicholas D.; International Search Report; Dec. 19, 2002.

Media Market Makers. http://mediamarketmakers.com An "open marketplace for buying, selling and planning advertising." Downloaded and printed on Jan. 12, 2006, 45 pages.

* cited by examiner

ONLINE TRADING FOR THE PLACEMENT OF ADVERTISING IN MEDIA

This invention claims the benefit of Provisional Application Ser. No. 60/323,060, filed on Sep. 18, 2001.

BACKGROUND OF THE INVENTION

1. Field of the Invention

This invention relates to a method and system of procuring advertising space in media, such as printed publications, billboards, radio, television, videos, web pages, portals and the like.

2. Description of the Prior Art

Advertisement space is generally marketed by the media to prospective advertisers. The advertisement space is usually offered at a price that may or may not be negotiable, especially in a large market or market of upscale customers. Thus, the advertiser is often a buyer in a seller's market. With the advent of the Internet and the World Wide Web (Web), a variety of advertising techniques have become known. Some of these techniques involve the delivery of specific advertisements to specific customers as described, for example, in U.S. Pat. Nos. 5,636,346, 6,009,410 and 6,182,050 B 1. Other techniques involve the scheduling and delivery of advertisements as described, for example in U.S. Pat. Nos. 5,105,184, 5,937,392, 5,999,912, 6,009,409, 6,026,371 and 6,029,045. Online trading systems are also known as described, for example, in U.S. Pat. Nos. 5,890,138, 5,966,699, 6,085,169 and 6,058,417. These systems generally manage online auctions of various products or services. However, none of the above-described online trading systems are directed to the selling or buying of advertising space.

Under the current advertisement procurement system, there are also many constraints on an advertiser's ability to locate media outlets in which to advertise. This is especially true for advertisers wishing to broadly reach across local or rural communities through the smaller media outlets. The present invention, for the first time, provides prospective advertisers with a system for one-stop-shopping for underused or hard-to-find media outlets and at the same time naming the price at which they are willing to explore advertising in those markets. Similarly, the present invention, for the first time, provides those same media outlets a system for reaching and negotiating with new prospective clients.

SUMMARY OF THE INVENTION

The present invention is directed to a method of conducting online trading for the placement of advertisement in a media, where the method includes the steps of: conducting an online session with an advertiser to form an auction ticket of specifications for the placement of the advertisement; notifying one or more media outlets of the ticket of specifications; recording bids submitted by the media outlets in non-monetary units; notifying the advertiser of said bids; and allowing the advertiser to accept or reject one or more of the bids received, based at least in part on the advertiser's subjective criteria.

It is an object of the present invention to provide a method of procuring advertising space in media.

It is another object of the present invention to provide a system of procuring advertising space in media.

The foregoing and other objects of the invention are achieved by the method of the present invention, which conducts online trading with media outlets that bid for an advertisement at a price specified by an advertiser. An online session is conducted with the advertiser to form an auction ticket of specifications for the advertisement. The auction ticket specifies the price that the advertiser will pay for the advertisement. The ticket additionally specifies, for example, the date or dates the advertisement is to run, number of placements, color preference, position on a page, position within the media. The advertiser selects the media outlets from whom bids are to be solicited out of the universe of participating media outlets. Selected media outlets are automatically notified of the auction ticket and their bids are solicited. Thus, according to the present invention, the advertiser is able to control the price of the advertisement by specifying the price it will pay for an advertisement and is able to control the scope of the auction as well by selecting the media outlets to be notified and solicited for bids. The media outlets' bids are submitted in non-monetary units, such as dimensional units of the space the advertisement is to occupy in the media. The advertiser can either accept one or more bids or accept no bid at all.

The system of the invention uses a computer system that runs a program that performs the method of the invention.

BRIEF DESCRIPTION OF THE DRAWING

Other and further objects, advantages and features of the present invention will be understood by reference to the following specification in conjunction with the accompanying drawings, in which like reference characters denote like elements of structure and.

DESCRIPTION OF THE INVENTION

The advertising placement method and system of the present invention is contemplated for the placement of an advertisement in any medium of expression including, for example, printed publications, radio, television, videos, network portals, web pages, billboards and the like. However, by way of example, the advertising method and system of the invention will be described herein for the example of a printed publication.

Figure 1:
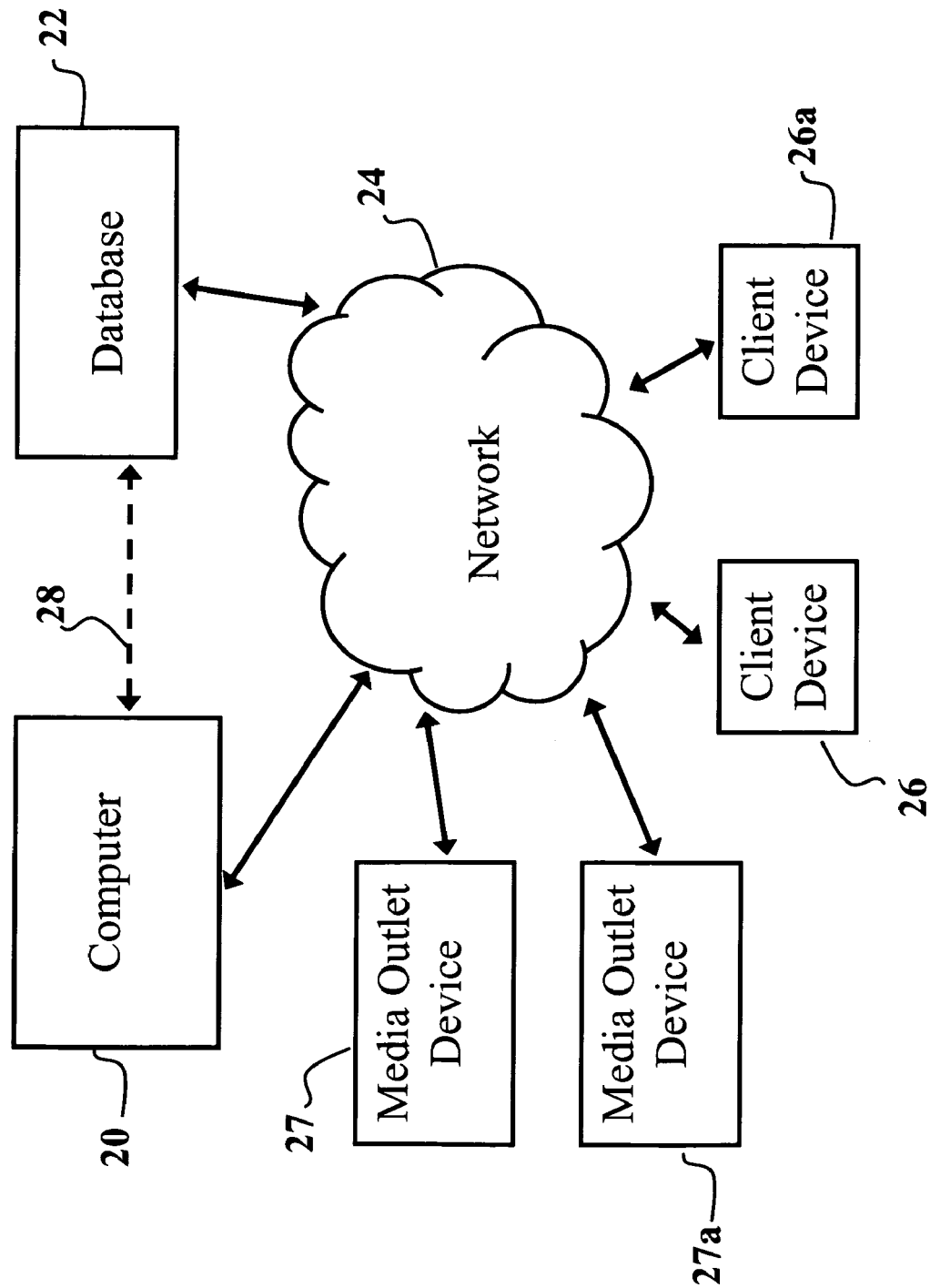
FIG. 1 is a block diagram of a communication system in which the method and system of the present invention may be used.

Referring to FIG. 1, a computer 20 is interconnected via a network 24 with a database 22, a plurality of client devices 26, 26a and a plurality of media outlet devices 27, 27a. Computer 20 may also communicate directly with database 22 as shown by a dashed line 28 in FIG. 1. Computer 20 may be any computer, known presently or in the future, that has a capability of communicating via network 24. Computer 20 may be a single computer or several computers connected in a distributed computing system via network 24 or via a local area network (not shown). Database 22 may be any database and may be a single database or a plurality of databases. Network 24 may be any network, known presently or in the future, such as an Internet, an Intranet, a World Wide Web (Web) or the like. Network 24 may include wired, wireless, and/or satellite links and the like. Client devices 26, 26a and media outlet devices 27, 27a may be any communication devices, known presently or in the future, such as a personal computer, a telephone, a fax machine, a hand held computing device or other device with a user input/output interface for communicating via network 24 with computer 20. The input/output interface of client devices 26, 26a provide for receipt and transmittal of information over network 24. Many such interfaces are graphical and are well known in the art, and include by way of two well-known examples, Microsoft Internet Explorer and Netscape Navigator. The system of FIG. 1 may be modified, as would be known and understood by one skilled in the art, to allow for use with a large number of client devices and/or media outlet devices.

Figure 2A:
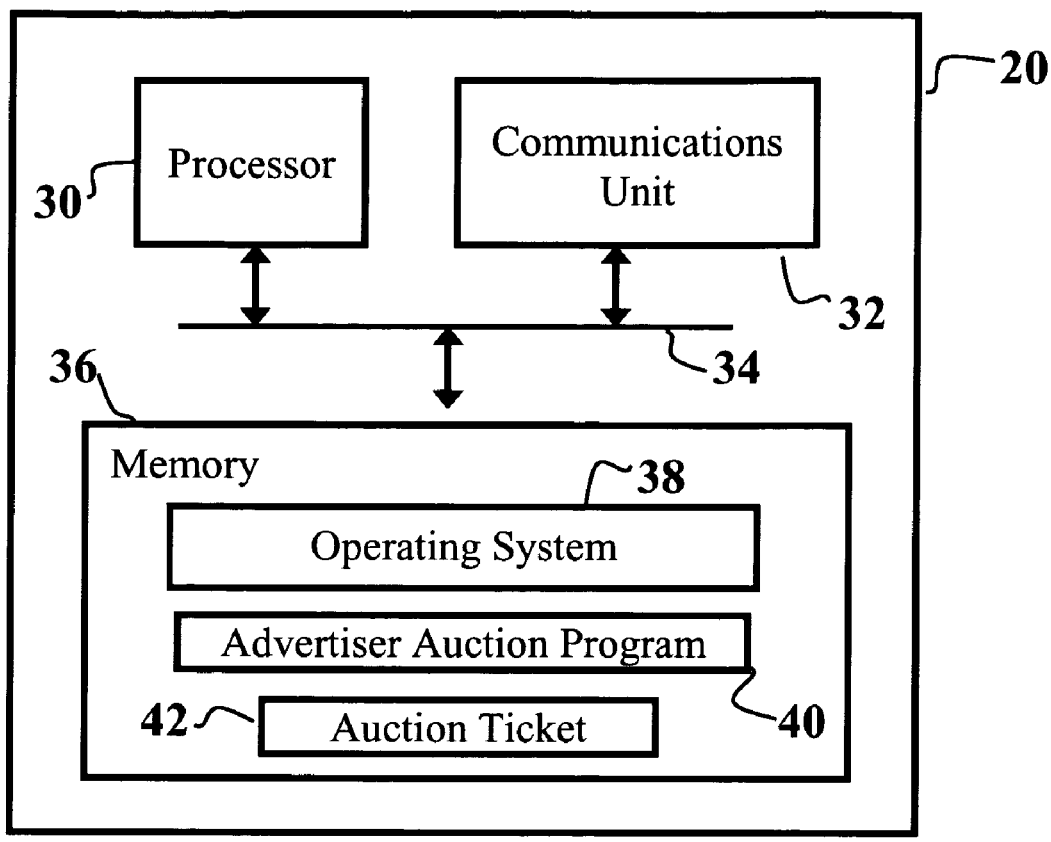
FIG. 2a is a block diagram of a computer system of the present invention.

Referring to FIG. 2a, computer 20 includes a processor 30, a communications unit 32, such as a high-speed modem, and a memory 36 interconnected via a bus 34. Memory 36 includes an operating system 38, an advertiser auction program 40 and an auction ticket 42. Operating system 38 includes the necessary code to cause processor 30 to execute advertiser auction program 40 and to communicate via communications unit 32 and network 24 with database 22, client devices 26, 26a and media outlet devices 27, 27a. Communication means may comprise computer 20, network 24, client device 26 and media outlet device 27. Communications module may comprise computer 20, network 24, client device 26 and media outlet device 27.

Figure 2B:
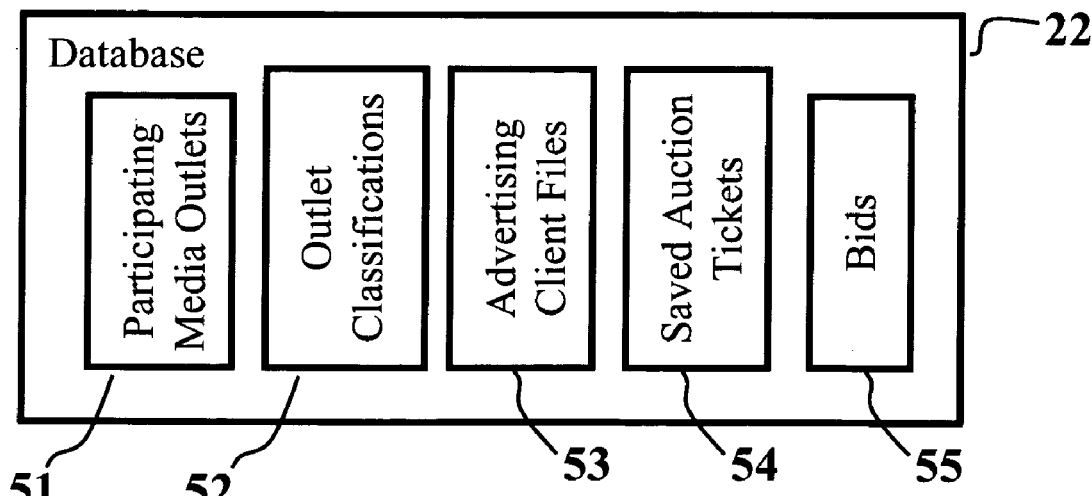
FIG. 2b is a block diagram of a computer database of the present invention.

Referring to FIG. 2b, database 22 includes participating media outlets 51, outlet classifications 52, advertising client files 53, previously completed saved auction tickets 54 and bids 55. Mean for recording bids may comprise database 22, computer 20, network 24 and media outlet device 27. Module for recording bids may comprise database 22, computer 20, network 24 and media outlet device 27.

According to the present invention, computer 20 runs advertiser auction program 40 to conduct advertiser auctions. Advertiser auction program 40 conducts an online session with an advertiser via a client device 26 to develop auction ticket 42. The online session is conducted over the network and between computer 20 via communications unit 32 and client devices 26, 26a, previously noted for their communication capability. An online session means may comprise a client device 26, input/output interface, network 24 and computer 20. An online session module may comprise a client device 26, input/output interface, network 24 and computer 20. Advertiser auction program 40 permits the advertiser to control aspects of the auction by developing auction ticket 42 that describes the specifications of the desired advertisement and the monetary amount the advertiser will spend for the advertisement. Advertiser auction program 40 prompts the advertiser to enter particular types of information at particular points. The client-entered information in response to those prompts makes up data elements. For example, client-entered data elements of an auction ticket specification step make up the specifications of auction ticket 42. The auction ticket additionally specifies, for example, the date or dates the advertisement is to run, number of placements, color preference, position on a page and position within the media. When all the data elements for the auction ticket 42 have been entered, advertising auction program 40 saves the auction ticket in database 22 in saved auction tickets 54. Once the advertiser completes the auction ticket 42 and selects the media outlets, the advertiser auction program 40, in conjunction with communications unit 32 and network 24 automatically notifies the selected media outlets, via media outlet device 27, of the initiation of the auction and the specifications of the auction ticket 42. A means for notifying media outlets of bids may comprise computer 20, database 22, network 24 and media outlet device 27. A module for notifying media outlets of bids may comprise computer 20, database 22, network 24 and media outlet device 27. The media outlets then submit, via media outlet device 27, in conjunction with network 24, advertiser auction program 40, database 22, bids in advertising units and specifications. For example, if the auction ticket specifies a cost of $100 for the advertisement, the media outlet responds by biding in terms of dimensional units, such as inches or centimeters, location within the media, timing and number of placements, and, optionally, by the availability of other advertising features that may be offered to enhance the value of the bid. Means for notifying advertisers of bids may comprise computer 20, database 22, network 24 and client device 26. Module for notifying advertisers of bids may comprise computer 20, database 22, network 24 and client device 26. The advertiser, at his option, can accept one or more bids or reject all bids. In this way, the present invention provides a novel method for an advertiser to select, for a set price, any number of advertising options that might satisfy a purely subjective value determination. Means for notifying media outlets of rejection or acceptance of bids may comprise computer 20, network 24 and media outlet device 27. Module for notifying media outlets of rejection or acceptance of bids may comprise computer 29, network 24 and media device 27.

A preferred embodiment shown by the following exemplary process contemplated within the present invention may begin with a first or registration step. In this step, the advertiser enters key client information such as advertiser's business, address, account information, password, username, telephone numbers and the like. The registration step might be bypassed altogether through the entry of a unique client username and password to automatically recall data entered by previously-registered advertisers. The advertiser's business information may be entered by selecting from a list of business types in a data entry field provided by the advertiser auction program 40. For example, the advertiser may simply select the closest description of his business from a list such as: Pet Store, Computer-Retail or Service Related. Thus, the advertiser's business selection may be used by advertiser auction program 40 to compile a list of suggested media outlets to notify regarding the initiation of the auction. The selection also assists the media outlets that have been notified of the auction in evaluating the advertiser's specifications without revealing the identity of the advertising client to the media outlet, thereby preventing the outlet from circumventing the auction and contacting the advertiser directly. Other key information fields may likewise be presented to the input/output interface of client device 26 in similarly well-known modes, such as drop down lists, text-entry fields and check boxes. Throughout the auction process, information may be entered by the advertising client in this way.

When the registration is complete the advertiser is prompted to move to the second step by activation of a continue button. The continue button may be an image on a computer display, activated through a mouse or a touchscreen interface; a push-button on a telephone pad; voice command recognition software or the like. Activation of this button saves the entered data and presents the input/output graphical interface for the next step.

In a second or auction ticket step, the client is prompted to supply the advertisement specifications that comprise the auction ticket. In a so-called fast auction procedure, the advertiser is given the opportunity to bypass the second step by recalling a previously prepared auction ticket for use or modification during the current session. If a fast auction is initiated and a prior action ticket is selected, the system automatically enters the data of that prior ticket in all the pertinent specification fields for the current auction ticket. If no prior ticket is selected, the advertiser enters the specifications that comprise the new action ticket. As an example illustrating this step, the input/output interface might comprise a screen which could accommodate the entry of auction specifications in a dollar amount; desired number of placements of the advertisement; the duration of the auction (days, hours, or the like); the day, dates or date range the advertisement is to run; the time required to select a winning bid; a yes/no answer as to whether the advertiser can supply a camera ready advertisement; and a color preference. Additional information, such as page position, placement within the publication or any other special requirements that further comprise the auction ticket can also be specified. The entry of these specifications creates the auction ticket and can be accomplished by client selection from pull down menus, check boxes, text entry fields, voice command, or any other data entry mode currently know in the art.

The entry fields on the interface of the present example can be aligned with any number of text passages describing in a user-friendly way what is to be entered in the aligned entry box. For example, a text passage stating: "Enter dollar amount" may be positioned in alignment with the entry box for entry of the dollar amount that the advertiser wishes to spend for the advertisement being specified by auction ticket 42. In other embodiments, the entry of specifications can be prompted by user-friendly voice commands, prompts, symbolic representations, multimedia help screens or the like.

When the auction data has been entered, the advertiser is prompted to move to the next step by activation of a continue button. Activation of this button saves the entered data and presents the input/output interface for the next step.

Upon initiation of the third step, the advertiser auction program performs an analysis of client-selected specifications and generates a list of recommended media outlets to notify regarding the initiation of the advertiser's auction and the specifications of the auction ticket. In one embodiment, this list is formulated by the advertiser auction program by matching media outlet classifications previously stored in database 22 with client specifications such as advertiser business, address, date range and/or the advertiser's auction history retrieved from records previously stored in database 22. The advertiser auction software may be designed to suggest a very inclusive, extensive list to the client.

The client is given the opportunity to choose some, all or none of the media outlets from the suggested list. In this step, the client is also provided the opportunity to browse and select from the entire database of participating media outlets or perform a search based upon media outlet classification. The media outlets are classified, for example, according to distribution, format, frequency, niche and region. The distribution data specifies the distribution of the publication, for example, local, state or national. The format data specifies the type of publication, for example, by newspaper, magazine, tabloid and the like. The frequency data specifies how often the publication is published, for example, daily, weekly, monthly and the like. The niche data specifies the specific market targets, such as business, garden, arts, aviation, and the like. The region data specifies the region(s) of interest by state and metro area. The client thus can select a more particularly chosen set of media outlets for notification of the auction and auction ticket.

When the media outlets have been selected, the advertiser is prompted to move to the next step by activation of a continue button. Activation of this button saves the entered data and presents the input/output interface for the next step.

In a fourth step, a summary of the auction ticket is then presented to an advertiser's client device 26. The summary comprises a representation of previously entered selections for review, editing and or amending by the advertiser. Thus, media outlets selected previously in step three, the auction ticket specifications selected in step two and the advertisers business and registration information entered in step one are presented for review. The client is presented with a means for choosing to recall any of the above data sets for editing and/or amending and a means for saving the edits of amendments.

This step also features the option to save the auction ticket on the database for recall and use with the fast auction feature of the first step for the purpose of creating an identical or similar auction in the future.

Figure 3:
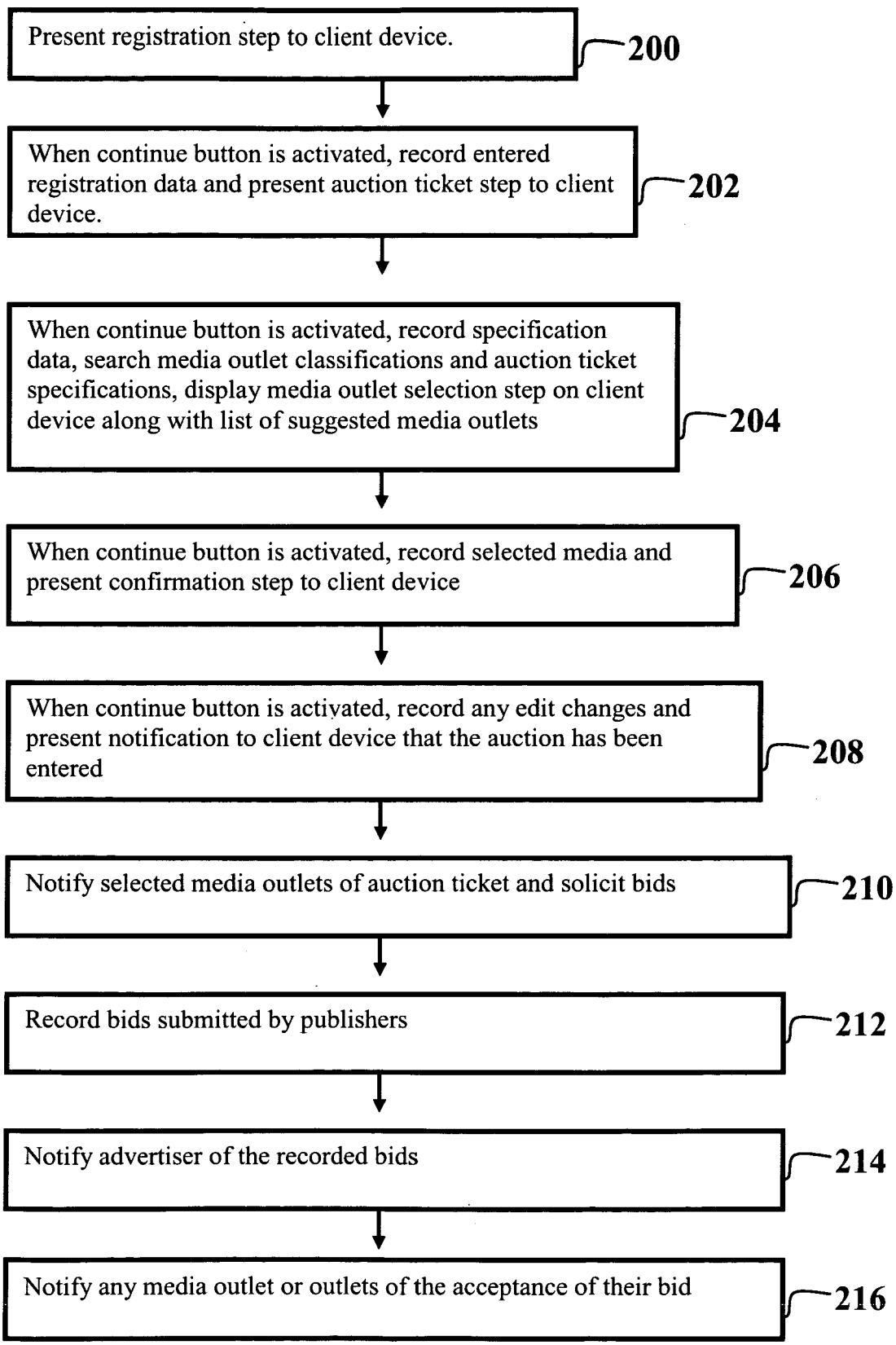
FIG. 3 is a flow diagram of the advertiser auction program of the FIG. 2a computer system.

FIG. 3 illustrates a preferred embodiment which utilizes advertiser auction program 40. An exemplary process contemplated within the present invention may first begin at step 200, which presents the preferred registration step graphics that are displayed via the input/output interface on advertiser's client device 26. When the advertiser has entered registration and business data and has activated a continue button, step 202 records the entered registration data and displays the next input/output interface for the entry of auction ticket specifications. When the advertiser has entered the auction specifications and activated a continue button, step 204 records the auction ticket specifications, searches media outlet classifications and displays the media outlet selection step along with a list of suggested media outlets in the next graphical interface. When the advertiser has completed selection of media outlets to notify, activation of the continuation button initiates step 206, which records the selected media outlets and displays the interface for editing of auction ticket 42. After the advertiser reviews the auction ticket 42 and edits as necessary, the advertiser activates the continue button, and step 208 records any edit changes and presents the client device with notification that the auction has started. In step 210, advertiser auction program 40, in conjunction with communications unit 32, network 24 and media outlet device 27, gives notice of the auction by communicating auction ticket 42 to the selected media outlets and invites interested media outlets to submit bids. In step 212, advertiser auction program 40 records bids submitted by the media outlets in database 22 and bids 55. In step 214, advertisers auction 40, in conjunction with communications unit 32, network 24 and client device 26, notifies the advertiser of the recorded bids. When the advertiser receives one or more bids that meet his subjective approval or value determination, the advertiser selects the media outlet or outlets via the graphical input/output interface and activates an accept bid button which initiates step 216 for the notification of media outlets that their bid has been accepted The notification in step 216 is executed by advertisers auction program 40, in conjunction with communications unit 32, network 24 and media outlet device 27.

In another contemplated embodiment (not shown), the advertiser auction system includes steps that comprise an advertisement design shop or design center. In this embodiment, the advertiser auction system presents the advertiser with a series of sequential steps to allow the advertiser to create, during the same or subsequent online sessions, a publication-ready advertisement for transmittal to the media outlet directly through the advertiser auction system. For example, the advertiser can be guided through the design process by choosing among formats, artwork, text selections and/or phrases that are suggested by the advertiser auction system. An example of a contemplated embodiment of the disclosed design center component of the advertiser auction system includes user-friendly design-guide programs know in the art as wizards, such as the wizard found in the commercially popular Microsoft Publisher program, or available from Bizcards dot com. In subsequent steps, the advertiser may submit the designed advertisement directly to the media outlets for publication through the advertiser auction system. In the alternative, the advertiser may transmit through the advertiser auction system a previously created, electronically stored advertisement copy directly to the media outlets.

Steps may also be included to provide a means for effecting payment for the advertisement directly to the media outlet through the advertiser auction system. The means for effecting payment may include credit card, debit card or wire transfer instructions.

The claims which follow are to be interpreted to cover all of the equivalent structures, methods and conventionally-known variations and modifications to the system components described herein, as would be known by those skilled in the art. The inventions, thus, not to be limited by the above exemplary disclosure, but only by the following claims. The embodiments of the invention in which an exclusive property or privilege is claimed are defined as follows.

I claim:

1. A method of conducting online trading for the placement of an advertisement in a medium or media, said method comprising:
   (a) conducting an online session with an advertiser to form an auction ticket of specifications for the placement of the advertisement;
   (b) notifying one or more media outlets of said ticket of specifications for said advertisement;
   (c) recording bids submitted by said media outlets for placement of said advertisement, wherein said bids are submitted in non-monetary units;
   (d) notifying said advertiser of said bids; and
   (e) allowing said advertiser to accept or reject one or more of said bids based on the advertiser's subjective criteria.

2. The method of claim 1, wherein said ticket of specifications specifies at least the price of the advertisement.

3. The method of claim 2, wherein said ticket of specification further specifies one or more members of the group consisting of: date or dates the advertisement is to run, number of placements, color preference, position on a page, position within the media and the media outlets who are to be notified by step (b).

4. The method of claim 1, wherein said bids include one or more members of the group consisting of advertising space, time duration, position on a page, position on a screen, position on a web page and position within the media.

5. The method of claim 1, wherein step (a) further comprises:
   (i) recording said specification by presenting one or more input/output interfaces for entry of a plurality of data elements that form said specification; and
   (ii) identifying said one or more media outlets from media outlet selections provided by said advertiser.

6. A computer system that conducts online trading for the placement of an advertisement in a medium or media, said system comprising:
   online session means for conducting a session with an advertiser to form an auction ticket of specifications for said advertisement;
   communication means for notifying one or more media outlets of said ticket of specifications for said advertisement;
   means for recording bids submitted by said media outlets for placement of said advertisement, wherein said bids are submitted in non-monetary units;
   means for notifying said advertiser of said bids; and
   means for notifying said media outlets of said advertisers rejection or acceptance of said bids.

7. The computer system of claim 6, wherein said ticket of specifications specifies at least the price of the advertisement.

8. The computer system of claim 7, wherein said ticket of specification further specifies one or more members of the group consisting of: date or dates the advertisement is to run, number of placements, color preference, position on a page, position within the media and the media outlets who are to be notified by the communication means.

9. The computer system of claim 6, wherein said bids include one or more members of the group consisting of advertising space, time duration, position on a page, position on a screen, position on a web page and position within the media.

10. The computer system of claim 6, wherein online session means further comprises:
    means for identifying said specification by presenting one or more screens for entry of a plurality of data elements that form said specification, wherein said identifying means also identifies said one or more media outlets from media outlet selections provided by said advertiser.

11. A computer system that conducts online trading for the placement of an advertisement in a medium or media, said system comprising:
    online session module for conducting a session with an advertiser to form an auction ticket of specifications for said advertisement;
    communication module for notifying one or more media outlets of said ticket of specifications for said advertisement;
    a module for recording bids submitted by said media outlets for placement of said advertisement, wherein said bids are submitted in non-monetary units;
    a module for notifying said advertiser of said bids; and
    a module for notifying said media outlets of said advertisers rejection or acceptance of said bids.

* * * * *